(12) United States Patent
Voeltzel (10) Patent No.: US 7,132,625 B2
(45) Date of Patent: Nov. 7, 2006

(54) HEATABLE ARTICLE HAVING A CONFIGURED HEATING MEMBER

(75) Inventor: Charles S. Voeltzel, New Kensington, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 521 days.

(21) Appl. No.: 10/264,106

(22) Filed: Oct. 3, 2002

(65) Prior Publication Data

US 2004/0065651 A1 Apr. 8, 2004

(51) Int. Cl.
*B60L 1/02* (2006.01)

(52) U.S. Cl. .................. 219/203; 219/522; 219/541; 343/713

(58) Field of Classification Search .................. 219/19, 219/203, 522, 543, 544, 548, 219, 528; 29/611; 428/34, 174; 359/894, 603, 512; 338/306, 338/307, 308, 309; 343/704, 713
See application file for complete search history.

(56) References Cited

U.S. PATENT DOCUMENTS

| 2,557,983 | A | | 6/1951 | Linder ..................... 219/19 |
| 3,313,920 | A | * | 4/1967 | Gallez ..................... 219/522 |
| 3,313,929 | A | * | 4/1967 | Schiavone ............... 362/102 |
| 3,396,399 | A | | 8/1968 | Winegard ................. 343/811 |

(Continued)

FOREIGN PATENT DOCUMENTS

| EP | 00936375.5 | | 12/2000 |
| EP | 00939609.4 | | 12/2000 |
| EP | 1 168 888 | | 1/2002 |
| FR | 1391388 | | 3/1965 |
| GB | 2186769 | * | 8/1987 |
| GB | 2186796 | | 8/1987 |
| JP | 2-46683 | | 2/1990 |
| JP | 402046683 | * | 2/1990 |
| WO | 94/05524 | | 3/1994 |

OTHER PUBLICATIONS

U.S. Appl. No. 10/201,863 filed Jul. 24, 2002.
U.S. Appl. No. 10/201,864 filed Jul. 24, 2002.
ERTICO Committee Report entitled "Ensuring the correct functioning of ETC equipment installed behind metallized windscreens: proposed short-term solution", Version 2.0, Oct. 1998.
The Engineering Society for Advanced Mobility Land Sea Air and Space report SAE J2557 titled "Surface Vehicle Recommended Practice", preliminary draft, Jan. 2000.
Krause, "Antenna", First Edition, McGraw-Hill, 1950, p. 367.

*Primary Examiner*—Robin Evans
*Assistant Examiner*—L. Fastovsky
(74) *Attorney, Agent, or Firm*—Andrew C. Siminerio (57) ABSTRACT

A heatable article, e.g. a heatable windshield, having a generally trapezoidal shape has a conductive member, e.g. a conductive coating, between and in contact with a pair of spaced bus bars having different lengths. Selected portions of the coating between the bus bars are segmented to reduce the difference in watt density between the coatings at the bus bars when current moves through the coating. In one non-limiting embodiment, the width of the segments at the longer bus bar is less than the width of the segments at the longer bus bar. With this configuration, the watt density at the bottom of the windshield is increased to more efficiently remove ice and snow. In another non-limiting embodiment, the coating has a communication window to pass frequencies of the electromagnetic spectrum, e.g. RF frequencies, to obtain information from within the vehicle. The coating surrounding the conductive window has break lines to segment the coating to eliminate hot spot around the periphery of the communication window.

55 Claims, 3 Drawing Sheets

U.S. PATENT DOCUMENTS

| | | | |
|---|---|---|---|
| 3,491,438 A | 1/1970 | Brittan et al. | 29/611 |
| 3,789,191 A | 1/1974 | Spindler | 338/24 |
| 3,789,192 A | 1/1974 | Spindler | 219/522 |
| 3,790,752 A | 2/1974 | Boaz et al. | 219/522 |
| 3,794,809 A | 2/1974 | Beck et al. | 219/203 |
| 3,928,748 A | 12/1975 | Sauer | 219/522 |
| 4,100,398 A | 7/1978 | Levin | 219/541 |
| 4,396,826 A * | 8/1983 | Orcutt et al. | 219/522 |
| 4,543,466 A | 9/1985 | Ramus | 219/203 |
| 4,587,769 A | 5/1986 | Cathers | 51/165.87 |
| 4,656,339 A * | 4/1987 | Grise | 219/528 |
| 4,820,902 A | 4/1989 | Gillery | 219/203 |
| 4,864,316 A * | 9/1989 | Kaoru et al. | 343/704 |
| 4,940,317 A * | 7/1990 | Reuben | 359/512 |
| 5,030,592 A | 7/1991 | Komarneni et al. | 501/9 |
| 5,182,431 A | 1/1993 | Koontz | 219/203 |
| 5,213,828 A | 5/1993 | Winter et al. | 428/46 |
| 5,240,886 A | 8/1993 | Gulotta et al. | 501/70 |
| 5,434,384 A * | 7/1995 | Koontz | 219/203 |
| 5,492,750 A | 2/1996 | Shumaker, Jr. et al. | 428/192 |
| 5,523,162 A | 6/1996 | Franz et al. | 428/421 |
| 5,540,961 A * | 7/1996 | Reul et al. | 428/34 |
| 5,593,929 A | 1/1997 | Krumwiede et al. | 501/70 |
| 5,798,499 A * | 8/1998 | Shibata et al. | 219/203 |
| 5,824,993 A * | 10/1998 | Chrysochoos et al. | 219/203 |
| 5,877,473 A * | 3/1999 | Koontz | 219/203 |
| 5,990,449 A * | 11/1999 | Suglyama et al. | 219/219 |
| 6,011,244 A * | 1/2000 | Castle et al. | 219/522 |
| 6,027,766 A | 2/2000 | Greenberg et al. | 427/226 |
| 6,100,500 A * | 8/2000 | Jefferson, Jr. et al. | 219/203 |
| 6,193,378 B1 * | 2/2001 | Tonar et al. | 359/603 |
| 6,356,236 B1 * | 3/2002 | Maeuser et al. | 343/713 |
| 6,396,026 B1 * | 5/2002 | Gillner et al. | 219/203 |
| 6,582,799 B1 * | 6/2003 | Brown et al. | 428/174 |
| 6,636,370 B1 * | 10/2003 | Freeman | 359/894 |

* cited by examiner

HEATABLE ARTICLE HAVING A CONFIGURED HEATING MEMBER

RELATED APPLICATIONS

The interlayer composite disclosed in U.S. patent application Ser. No. 10/201,863 filed Jul. 24, 2002, in the names of Bruce A. Bartrug, Allen R. Hawk, Robert N. Pinchok and James H. Schwartz for "Edge Sealing Of A Laminated Transparency" and the bus bar arrangement disclosed in U.S. patent application Ser. No. 10/201,864 filed Jul. 24, 2002, in the name of Allen R. Hawk for "Eliminating Hot Spots At End Portions Of Bus Bars Of A Heatable Transparency Having An Electrically Conductive Member" can be used in the practice of this invention. The U.S. patent application Ser. Nos. 10/201,863 and 10/201,864 are hereby incorporated by reference.

BACKGROUND OF THE INVENTION

1. Field of the Invention

This invention relates to an article, e.g. a transparency having a configured heatable member, e.g. an electrically conductive member applied to a surface of the article, and more particularly, to a heatable automotive transparency, e.g. a windshield having electrically conductive coating segments. The configured conductive member uniformly heats the surface of the article when the conductive member is energized.

2. Discussion of the Technology

Automotive heatable windshields, e.g. of the type disclosed in U.S. Pat. No. 4,820,902, include two glass sheets laminated together by a plastic interlayer, usually a sheet of polyvinyl butyral ("PVB"). A pair of spaced bus bars between the glass sheets are in electrical contact with an electrically conductive member. One type of conductive member is a sputtered electrically conductive coating of the type disclosed in European Patent Application No. 00939609.4, applied to a major surface of one of the glass sheets, and another type of conductive member includes a plurality of electrically conductive filaments of the type disclosed in U.S. Pat. No. 5,182,431. Each of the bus bars is electrically accessible by an external lead to pass current from a power source through the bus bars and the conductive member to electrically heat the conductive member to conductively heat the inner and outer surfaces of the windshield. The heated windshield surfaces attain a temperature sufficient to remove fog, and melt snow and ice. As can be appreciated, heatable windshields are practical, and in some geographical areas, heatable windshields are a requirement especially during the winter season.

Usually, the automotive windshield has a generally trapezoidal peripheral shape, and the outer major surface of the windshield as mounted in the automobile is convex with the upper portion of the windshield having the shorter length. The conductive member, usually a conductive sputtered coating between the sheets of the windshield, follows the peripheral outline of the windshield and is spaced from the peripheral edges of the sheet on which it is applied. Because of the mounted position of the trapezoidal shaped windshield, the coating is between a pair of spaced bus bars of different lengths. More particularly, the top bus bar has a shorter length than the bottom bus bar to follow the configuration of the windshield and the surface area of the windshield to be heated.

A limitation of the presently available windshields is the difference in the watt density between the coating at the shorter top bus bar and the coating at the longer bottom bus which results in non-uniform heating of the windshield surfaces and reduced efficiency in the removal of fog, ice and/or snow at the bottom portion of the windshield.

U.S. Pat. Nos. 3,789,191; 3,789,192; 3,790,752; 3,794,809; 4,543,466, and 5,213,828 present a general discussion on heatable windshields.

The non-uniform heating of the windshield surface is also present when the coating has a communication window. The communication window is provided to, among other things, pass frequencies of the electromagnetic spectrum through the conductive member. The frequencies can be in the radio frequency (RF) range to collect information from the interior of the vehicle, e.g. transit pass number at tollbooths and/or can be in the infrared range or visible range to activate a device, e.g. a rain sensor and/or an optical device. The area within the communication window has a higher resistance than the coated area surrounding the communication window because the area within the communication window has no coating or the coating is partially removed to pass frequencies of a selected wavelength range. The non-uniform heating around the communication window is observed when current moves through the coating to heat the windshield surfaces. The periphery of the communication window generates hot spots as a result of the higher watt density at the periphery of the communication window.

Communication windows are discussed in the ERTICO Committee report titled "Ensuring the Correct Functioning of ETC Equipment Installed Behind Metallized Windscreens: Proposed Short-term Solution" Version 2.0, October 1998, and The Engineering Society For Advanced Mobility Land Sea Air and Space report SAE J2557 titled "Surface Vehicle Recommended Practice", Preliminary Draft, January 2000.

As can be appreciated, it would be advantageous to provide a heatable article, e.g. a heatable windshield that does not have the limitations of the presently available heatable windshields; more particularly, to provide an electrically conductive member that when energized uniformly heats the surfaces of a windshield, with or without an area to pass frequencies of the electromagnetic spectrum.

SUMMARY OF THE INVENTION

The invention relates to configurations of a heatable electrically conductive member of a heatable article to provide a desired heating pattern when the member is energized, e.g. a uniform heating pattern. In one non-limiting embodiment of the invention the heatable article includes a first bus bar and a second bus bar spaced from the first bus bar. An electrically conductive member, e.g. a sputtered coating having a conductive film between a pair of dielectric films is between and in electric contact with each of the bus bars; the portion of the conductive member adjacent the first bus bar has a plurality of discreet electrically isolated electrically conductive segments with selected ones of the segments have varying width as the distance from the first bar increases.

The heatable article of the invention includes but is not limited to a transparence of the type used on an enclosure such as a residential home, a commercial building, a space vehicle, an air vehicle, a land vehicle, an over the water vehicle, an under the water vehicle and/or a refrigerator having a door with a viewing area. In a preferred non-limiting embodiment of the invention, the heatable article is an automotive transparence such as a windshield, a side window, a back window and/or a moon roof.

In another non-limiting embodiment of the invention, the automotive transparency has the first bus bar longer than the second bus bar and a conductive coating between and in contact with the bus bars. The coating includes a plurality of discreet electrically isolated coating segments extending from the first bus bar to the second bus bar with the width of selected ones of the conductive segments increasing as the distance from the first bus bar increases.

Other non-limiting configurations of heatable members include:

(a) a continuous coating from the second bus bar to a position between the bus bars defined as a transition position and a plurality of discreet electrically isolated coating segments extend from the transition position to the first bus bar with selected ones of the coating segments have decreasing width as the distance from the first bus bar decreases;

(b) a plurality of discreet electrically isolated coating segments extending from the first bus bar to the second bus bar with selected ones of the coating segments having a decreasing width as the distance from the first bus increases to a position between the first and second bus bar defined as a transition position and an increasing width from the transition position to the second bus bar;

(c) a plurality of discreet electrically isolated electric coating segments extending from the first bus bar to the second bus bar and the width of selected ones of the coating segments decreases as the distance from the first bus bar increases;

(d) a plurality of discreet electrically isolated electric coating segments identified as a first plurality of discreet electrically isolated electric coating segments and further including a second plurality of discreet electrically isolated electric coating segments, the first and second plurality of coating segments extending from the first bus bar to the second bus bar and the width of the first plurality coating segments increasing as the distance from the first bus bar increases and the width of the second plurality of coating segments being substantially constant from the first bus bar to the second bus bar;

(e) a plurality of discreet electrically isolated electric coating segments identified as a first plurality of discreet electrically isolated electric coating segments and further including a second plurality of discreet electrically isolated electric coating segments, the first and second plurality of coating segments extend from the first bus bar to the second bus bar and the width of the first plurality coating segments decreasing as the distance from the first bus bar increases and the width of the second plurality of coating segments being substantially constant from the first bus bar to the second bus bar;

(f) a coating having a communication window, the resistance within the communication window is greater than the resistance outside the communication window, the plurality of discreet electrically isolated electric coating segments extend from one bus bar to the other bus bar and are on each side of the communication window;

(g) ends of the first and second bus bars are closer together than the portions of the bus bars between their ends;

(h) a coating having a plurality of discrete electrically isolated segments with at least one of the segments having a width greater at the first bus bar than at the second bus bar;

(i) a coating having a plurality of discrete electrically isolated segments with at least one of the segments having the same width at the first and second bus bars;

(j) a coating having a plurality of discrete electrically isolated segments with at least one of the segments having a width smaller at the first bus bar than at the second bus bar;

(k) bus bars and conductive coating between and facing the major surface of the glass sheet and the plastic sheet, and (l) a pair of plastic sheets with the bus bars and coating between the plastic sheets.

In another non-limiting embodiment of the invention, the heatable article or automotive transparency includes a pair glass sheets; at least one plastic sheet between the pair of glass sheets securing the glass sheets together; a first and a second bus bar between the glass sheets and spaced from one another. The first bus bar is longer than the second bus bar, and an electrically conductive member, e.g. an electrically conductive coating is between and in electric contact with the first and second bus bars. The conductive member has at least two discreet segments in electrical contact with one of the bus bars; the watt density of the conductive member adjacent the first bus bar is at least 80%, preferably at least 90% and more preferably at least 95% of the watt density of the conductive member adjacent the second bus bar.

DETAILED DESCRIPTION OF THE INVENTION

As used herein, spatial or directional terms, such as "inner", "outer", "left", "right", "up", "down", "horizontal", "vertical", and the like, relate to the invention as it is shown in the drawing figures. However, it is to be understood that the invention can assume various alternative orientations and, accordingly, such terms are not to be considered as limiting. Further, all numbers expressing dimensions, physical characteristics, and so forth, used in the specification and claims are to be understood as being modified in all instances by the term "about". Accordingly, unless indicated to the contrary, the numerical values set forth in the following specification and claims can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 5.5 to 10. Also, as used herein, the terms "deposited over", "applied over", or "provided over" mean deposited, applied, or provided on but not necessarily in surface contact with. For example, a material "deposited over" a substrate does not preclude the presence of one or more other materials of the same or different composition located between the deposited material and the substrate.

In the following discussion, the invention will be described for use on vehicular transparencies having an electrically conductive member having opposite sides of unequal length, e.g. one side longer than the opposite side. As will be appreciated, the invention is not limited thereto, and can be practiced on any transparent or opaque article having an electrically conductive member having one side longer than the other side and/or having opposite sides of equal length, e.g. a rectangular or square shaped conductive member where selective heating of the article surface is desired. Articles that can be used in the practice of the invention include, but are not limit to, windows and/or walls for residential homes and commercial buildings, and widows used for refrigerator doors.

The vehicular transparency in the following discussion is an automotive windshield; however, the invention is not limited thereto and can be any type of a vehicular transparency such as, but not limiting the invention thereto, a monolithic or laminated automotive sidelight, e.g. of the type disclosed in European Patent Application No 00936375.5 which document is hereby incorporated by reference, a moon roof and a backlit or a rear window. Further the transparency can be for any type of vehicle such as, but not limiting the invention thereto, land vehicles such as, but not limiting the invention thereto, trucks, cars, motorcycles, and/or trains, to air and/or space vehicles, and to above and/or below water vehicles.

Figure 1:
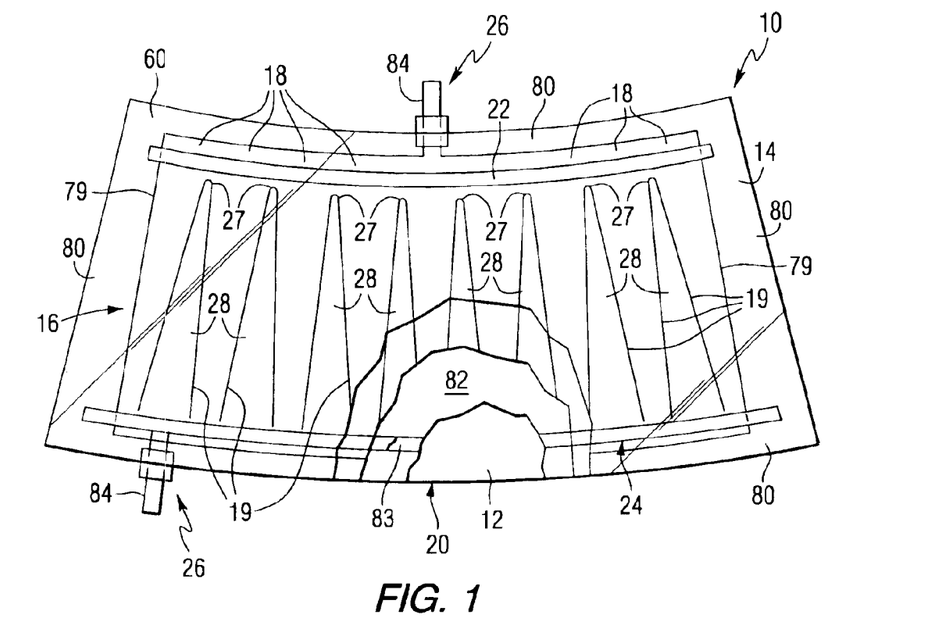
FIG. 1 is a plan view of an automotive windshield having a non-limiting embodiment of a heatable member incorporating features of the invention.

With reference to FIG. 1 there is shown a non-limiting embodiment of an automotive windshield 10 incorporating features of the invention. The windshield 10 includes a pair of glass sheets or blanks 12 and 14, and an electrically conductive member incorporating features of the invention. In FIG. 1 the electric member incorporating features of the invention includes an electrically conductive member 16 comprising a plurality of electrically conductive segments 18 discussed in detail below through which current is moved. The conductive segments 18 are on a surface of one of the glass sheets, e.g. outer surface of the inner sheet 14 of the windshield 10, also referred to as the No. 3 surface of the windshield, and are formed by deletion or break lines 19, as will be discussed later in more detail. In the practice of the invention, interlayer composite 20 of the type disclosed in U.S. patent application Ser. No. 10/201,863 can be used to laminate the glass sheets 12 and 14 together. The interlayer composite 20, discussed in more detail below, provides a top bus bar 22 spaced from a bottom bus bar 24 and a lead assembly 26 for each bus bar. The bus bars are in electric contact with the conductive members 18. With this arrangement, current moves through one of the lead assemblies 26 between the sheets 12 and 14; between the bus bars 22 and 24 through the segments 18 and through the other lead assembly 26 to heat the outer surfaces of the windshield 10 by conduction to remove fog, ice and/or snow, as the case may be.

In the presently available automotive heatable windshields, the internal conductive member 16 is usually a continuous coating having two metal films usually infrared reflecting films, e.g. silver films separated by dielectric layers, such as an oxide film sputtered from a tin doped zinc cathode, an oxide film sputtered from a zinc tin alloy cathode and/or of an oxide film sputtered from a zinc cathode. In the practice of the invention, but not limiting thereto, the coating is of the type disclosed in European Patent Application No. 00939609.4, which application is hereby incorporated by reference.

A limitation of the presently available heatable windshields is the difference in watt density (watts per unit area) between the top portion of the conductive coating and the bottom potion of the coating as the windshield is mounted in an automotive body (which is the position of the windshield as shown in FIG. 1). More particularly, the windshield is usually contoured having a convex outer surface and having a trapezoidal peripheral shape with the short length of the windshield at the top and the long length of the windshield at the bottom as the windshield is mounted. The coating is usually continuous throughout its surface, follows the peripheral shape of the sheet and is spaced from the peripheral edges of the sheet, on which the coating is applied. The bus bar at the top portion of the coating, e.g. the bus bar 22 shown in FIG. 1 is shorter in length than the bus bar at the bottom of the coating, e.g. the bus bar 24 shown in FIG. 1. The difference in watt density between the top portion of the coating and the bottom portion of the continuous coating results in the top portion of the windshield becoming hotter than the bottom portion when current is moved through the continuous coating.

The following non-limiting example is provided for a better appreciation of the foregoing discussion. Consider a trapezoidal shaped windshield with a height of 36.5 inches (0.93 meter), a top length of 65 inches (1.65 meters), and a bottom length of 85 inches (2.16 meters). A sputtered electrically conductive coating having a sheet resistance of 2.7 ohms per square applied between and in contact with bus bars having a width of 0.25 inches (0.64 centimeters ("cm")) will provide a bus bar to bus bar resistance of 1.31 ohms (2.7 ohms per square×(36.5 inches/(½(65 inches+85 inches))). Electrically connecting the bus bars to a 42 volt direct current power source, the conductive coating will draw 31.8 amps (42 volts/1.32 ohms) and 1336 watts (42 volts×31.8 amps) with an average watt density of 0.49 watt/square inch (1336 watts/2737.5 square inches (area of coating)). However, due to the difference in length between the top bus bar bus bar and the bottom bus bar, the watt density at the top portion of the coating will be 0.64 watts per square inch (0.49 watts per square inch/(65 inches/85 inches)) and the watt density at the bottom portion of the coating will be 0.38 watts per square inch (0.49 watts per square inch/(85 inches/ 65 inches)). As a result, the top of the windshield is hotter than the bottom of the windshield, and the windshield will de-ice from the top down. As can be appreciated, the accumulation of ice and snow is usually at the bottom of the windshield; therefore, it would be advantageous to increase the watt density at the bottom of the windshield to increase the temperature at the bottom of the windshield.

The difference in the watt density between the top portion and bottom portion of the coating is a result of the difference in the lengths of the bus bars, i.e. the top bus bar being shorter than the bottom bus bar to pass current through the trapezoidal shaped coating. A coating having a rectangular shape would eliminate or minimize the problem; unfortunately, this is not an acceptable solution because the bottom of the windshield is wider. Therefore, using a coating having a square or rectangular shape heats a smaller area at the bottom portion of the windshield where the ice and/or snow usually accumulate. Another solution would be to vary the sheet resistance of the coating to vary its conductivity between the top portion and the bottom portion of the windshield; however, since the coating is continuous, varying portions of the coating would be expensive and can result in coating areas of different percent transmission in the vision area of the windshield. The "vision area" is defined as the see through area of the windshield available to the driver and/or passenger.

In a non-limiting embodiment of the invention the difference in watt density between the portion of the coating at the top bus bar, e.g. the top portion of the coating, and the portion of the coating at the bottom bus bar, e.g. the bottom portion of the coating is minimized, if not eliminated by providing the coating segments 18 between and in contact with the bus bars. The coating segments 18 as shown in FIG. 1 have a larger cross sectional area at the top bus bar 22 than at bottom bus bar. In this non-limiting embodiment of the invention, the decrease in the cross sectional area of the coating segments 18 is generally uniform as the distance from the top bus bar increases. As can be appreciated, the invention is not limited to the dimensions of the coating segments 18 or the number of coating segments.

In accordance with one non-limiting embodiment of the invention, a laminate was made having coating segments of the type shown in FIG. 1, e.g. the coating segments 18. The coating segments were applied to a surface of a 1 foot (0.30 meter) square piece of glass between and in contact with a pair of spaced identical bus bars. The segments had a width of 5 millimeters (mm) at one bus bar and a width of 3 mm at the other bus bar. The piece having the coating was laminated to another piece of glass with the coating segments between the glass pieces. The bus bars were connected to a 12-volt direct current power source while the coating segments were viewed with an infrared camera. The heating pattern observed was a hotter coating at the bottom bus bar (the portion of the coating segments with the smaller width) than the coating at the top bus bar (the portion of the coating segments with the greater width). Normally, applying electric power to a continuous square shaped coating between a pair of equally spaced identical bus bars will uniformly heat the coating. The forgoing example demonstrates that changing the width of electric conducting segments can change the watt density and change the heating pattern.

Figure 2:
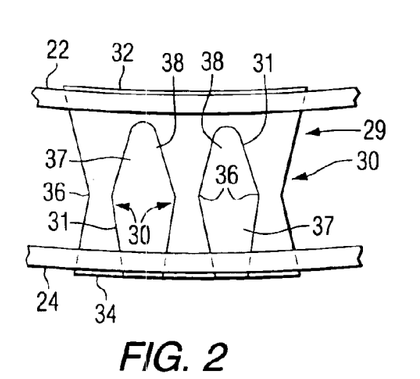
FIG. 2 is a fragmented plan view of an automotive windshield of the type shown in FIG. 1 having another non-limiting embodiment of a heatable member incorporating features of the invention.
Figure 3:
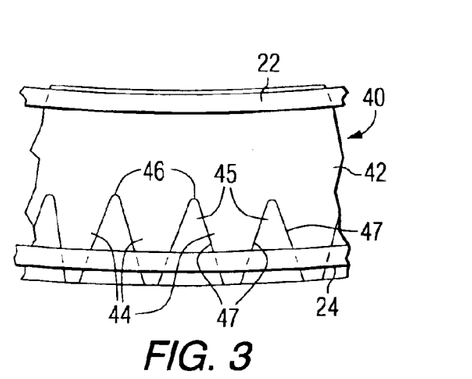
FIG. 3 is a view similar to the view of FIG. 2 showing still another non-limiting embodiment of a heatable member incorporating features of the invention.

A preferred non-limiting embodiment of the invention to determine the size and number of the coating segments using the dimensions of the example presented earlier is as follows. A continuous coating is divided into 130 vertical strips having a width at the top bus bar of 0.5 inch (1.27 cm) and a width of 0.654 inch (1.66 cm) (0.5 inch×(85 inches/65 inches)) at the bottom bus bar. The width of the coating segment at the bottom bus bar is then reduced to 0.382 inch (0.97 cm.). Then segmentation of the coating can be accomplished in any manner. For example, but not limiting to the invention, a laser can be used to impose break lines 19 in the coating to divide the coating into the segments 18 and segments 28 with ends 27 of segments 28 terminating short of the top bus bar 22 to electrically isolate the segments 28 from the top bus bar 22. The lower end of the break lines 19 can terminate near lower bus bar 24 (as shown in FIG. 1), or beneath bus bar 24, or can extend to the lower edge of the conductive member (as shown in FIGS. 2 and 3 which will be discussed later in more detail). Electrically isolating the segments 28 from the top bus bar 22 provides coating segments 18 having a 0.5 inch (1.27 cm) width at the top bus bar and a 0.382 inch width at the bottom bus bar and a spacing of 0.272 inch (0.69 cm) between the coating segments at the bottom bus bar. Coating segments having the wedged configuration, uniform coating thickness and the forgoing dimensions have a uniform watt density of 0.37 watts per square inch from the top bus bar, e.g. bus bar 22, to the bottom bus bar, e.g. bus bar 24. The total power draw of, and current through, the coating segments will be 1023 watts and 24.36 amps. This is a reduction from the above example, which drew 1336 watts and 31.8 amps through a continuous coating. As can now be appreciated, further reduction of the width of the coating segments 18 at the bottom bus bar while keeping the width of the coating strips at 0.5 inches at the top bus bar, further reduces the power and current which results in an increase in the watt density of the coating segments 18 at the bottom bus bar.

Although the foregoing non-limiting embodiment of the invention and those to follow, discuss varying the width of the coating segments, the invention contemplates varying the coating thickness, and/or the width, of the coating segment to vary the cross sectional areas between the top portion and bottom portion of the coating segments 18. In the preferred practice of the invention, the coating thickness is maintained constant and the width of the coating segment is varied. As can be appreciated, varying the thickness of a coating along a given length requires more procedures and equipment than keeping the coating thickness constant and varying its width. In the practice of the invention it is preferred to have the watt density of the coating portion at the bottom bus bar at least 80%, more preferably at least 90% and most preferably at least 95% of the watt density of the portion of the coating at the top bus bar. With this arrangement the watt density at the bottom of each coating segment is increased sufficiently to heat by conduction the portion of the glass from which the coating was removed to decrease the width of the coating segment.

Although the coating segments of the invention was discussed having the width of the segment continuously decrease as the distance from the top bus bar 22 increases or as the distance from the bottom bus bar 24 decreases, the invention is not limited thereto. More particularly and as can now be appreciated, in another non-limiting embodiment of the invention, the cross sectional area of the coating segments between the top and bottom bus bar can be changed to increase the temperature of selected portions of the windshield. For example and with reference to FIG. 2, there is shown an electrically conductive coating 29 divided into segments 30 by break lines 31 incorporating features of the invention. The segments 30 have end or top portion 32 at the top bus bar 22 wider than end or bottom portion 34 at the bottom bus bar 24 and a center portion 36 having a width less than the width of the top portion 32 and the bottom portion 34. With this arrangement, the center portion 36 of the segments 30 has a higher watt density than the watt density of the end portions 32 and 34 of the segments 30. As can be appreciated and as discussed previously, the cross sectional area of the segments 30 can be varied by changing the width of the segments 30 and/or the coating thickness of the segments 30. With continued reference to FIG. 2, the segments 30 can be provided in any usual manner, e.g. but not limiting to the invention, a laser can be used to impose break lines 31 and divide a continuous coating (shown only in FIG. 5) into the segments 30 having segments 37 between the segments 30 and having ends 38 of the segments 37 terminating short of the upper bus bar 22 to electrically isolate the segments 37 from the bus bar 22. In this particular embodiment of the invention, lines 31 extend to the lower edge of coating 29.

FIG. 3 illustrates still another non-limiting embodiment of the invention. Conductive coating 40 incorporating features of the invention includes a continuous coating portion 42 extending from the top bus bar 22 to a position between the top and bottom bus bars 22 and 24, respectively, and segments 44 extend from the continuous portion 42 of the coating 40 to the bottom bus bar 24. As can be appreciated, the coating segments 30 shown in FIG. 2 can be substituted for the segments 44 shown in FIG. 3. As can be appreciated and as discussed previously, the cross sectional area of the continuous coating portion 42 and/or the segments 44 can be varied by changing the width of the segments 44 and/or the coating thickness of the segments 44 and/or the coating thickness of the continuous coating portion 42. With continued reference to FIG. 3, the segments 44 can be provided in any usual manner, e.g. but not limiting to the invention, a laser can be used to impose break lines 47 in the coating and divide the bottom portion of continuous coating 40 into the segments 44 having segments 45 between the segments 44 and having ends 46 of the segments 45 terminating short of the bus bar 22 to electrically isolate the segments 45 from the bus bar 22. In this particular embodiment of the invention, lines 47 extend to the lower edge of coating 40.

Figure 4:
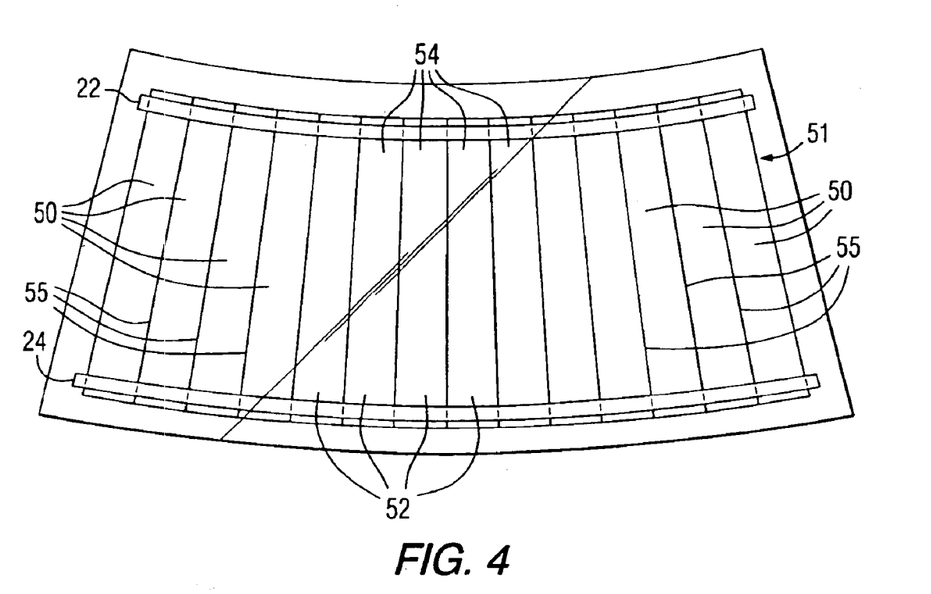
FIG. 4 is a view similar to the view of FIG. 1 showing a further non-limiting embodiment of the invention.

With reference to FIG. 4, there is shown windshield 48 having wedged shaped segments 50 incorporating features of the invention. In the non-limiting embodiment of the invention shown in FIG. 4, the magnitude of the difference in watt density between the coating portion at the top bus bar 22 and the coating portion at the bottom bus bar 24 is reduced by segmenting a conductive member or coating 51 into a plurality of segments 50 having a greater width at end portion 52 near the bottom bus bar than at end portion 54 near the top bus bar 22. Preferably but not limiting to the invention, uniformly spaced segments or strips have a width at the top bus bar of "W" inches, e.g. 0.5 inches and a width at the bottom bus bar of "W" ×(the length of the top bus bar divided by the length of the bottom bus bar), e.g. 0.65 inches (0.5 inches×(85 inches/65 inches)). The difference in watt density of the coating at the top bus bar and at the bottom bus bar is reduced because the one continuous coating or conductive member between the bus bars is reduced to a plurality of smaller discrete areas. Although the difference in the watt density of the coating at the top bus bar and at the bottom bus bar is reduced, the portion 54 of the segments 50 at the top bus bar 22 will have a higher watt density than the portion 52 of the segments 50 at the bottom bus bar 24. The segmented coating can be provided in any manner, e.g. but not limiting to the invention, applying a continuous coating (e.g. as shown in FIG. 5) over a surface of the sheet and using one or more lasers to impose break lines 55 in the coating between the bus bar to divide the coating into the segments 50.

As can be appreciated, the invention contemplates having segments of uniform width between and in contact with the bus bars. This can be accomplished, for example by increasing the width of the break line as it extends toward the lower bus bar 24. Further the invention contemplates a heatable member between and in contact with spaced bus bars made by combining one or more of the segments 18 shown in FIG. 1, the segments 30 shown in FIG. 2, the coating 40 shown in FIG. 3, the segments 50 shown in FIG. 4 and segments of uniform width.

Figure 5:
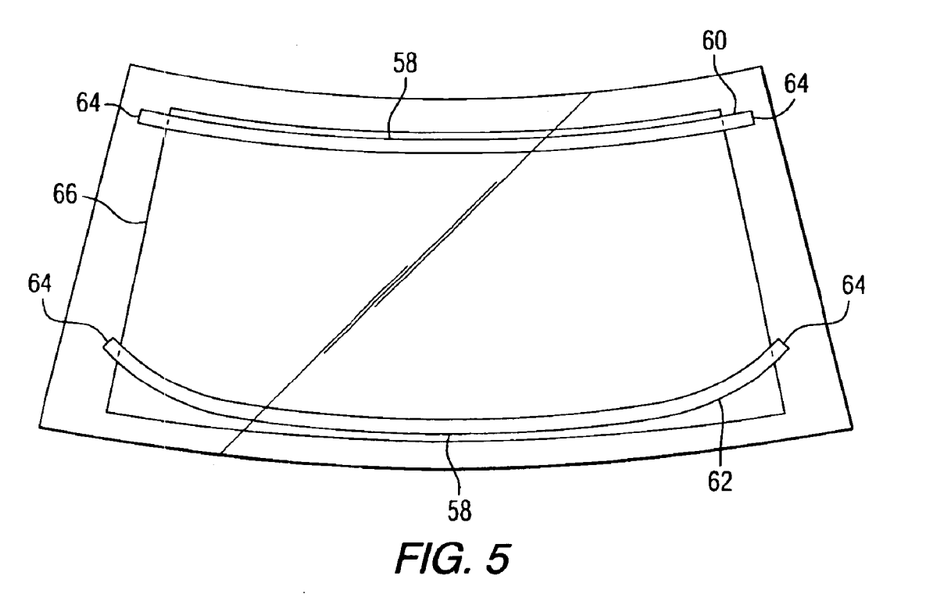
FIG. 5 is a view similar to the view of FIG. 1 showing still a further non-limiting embodiment of the invention.

In FIG. 5 there is shown windshields 56 incorporating a further non-limiting feature of the invention. In FIG. 5, center portions 58 of the bus bars 60 and 62 are spaced a greater distance apart than the end portions 64 of the bus bars 60 and 62. A continuous conductive member, e.g. coating 66 is between and in contact with the bus bars 60 and 62. Although not limiting to the invention, this can be accomplished by providing a generally straight top bus bar and a curved bottom bus bar i.e. a radiused bottom bus bar, and in particular concave bottom bus bar (as viewed from the top bus bar). Having the end portions of the top and bottom bus bars closer than the center portions of the bus bars provides a more uniform current flow between the bus bar to minimize if not eliminate hot spots at the end portions of the bus bars; however, it does not eliminate or significantly reduce the difference in watt density between the coating at the top bus bar and at the bottom bus bar. As can be appreciated, the continuous coating 66 can be replaced with the coating segments 18, 30 50 shown in FIGS. 1, 2 and 4 respectively or the coating 40 shown in FIG. 3.

Transparencies, e.g. windshields, having an electrically conductive coating are often provided with an area of high resistance, e.g. an uncoated area or an area having portions of the coating removed. These areas are usually referred to as "communication windows" or "telepeage". Frequencies of the electromagnetic spectrum, e.g. RF frequency, are transmitted through the communication window to obtain information, e.g. transit pass identification or vehicle identification, and infrared and visible light is transmitted through the communication window to activate devices such as rain sensors and optical devices. The watt density around the perimeter of the communication window is higher than the coating spaced from the perimeter of the communication window resulting in the edges of the communication window receiving more current than the coating surrounding the communication window. The additional current raises the temperature of the coating around the communication window, resulting in hot spots around the communication window. The communication window in a segment 18, 30, 44 or 50 of the invention would reduce the temperature of the hot spots in the coating around the communication window because current flow is limited, controlled and reduced because path is restricted. The following non-limiting embodiment of the invention shown in FIG. 6 and discussed below further reduces hot spots around the perimeter of the communication window when the communication window is in a segment and when the communication window is in a continuous coating, e.g. the coating 66 shown in FIG. 5.

Figure 6:
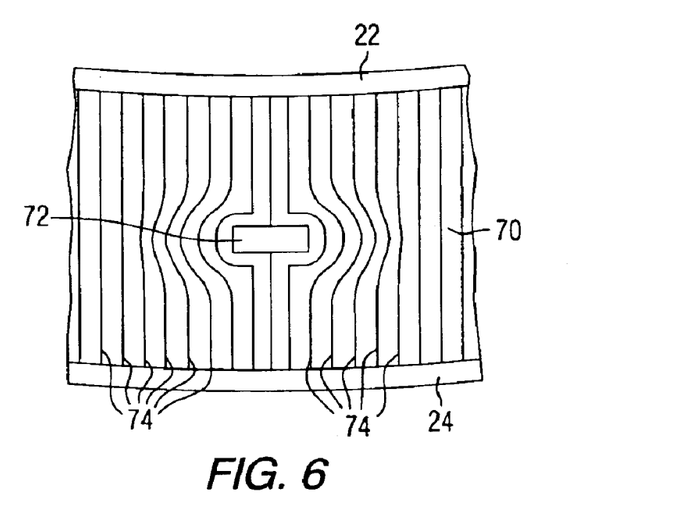
FIG. 6. is a view similar to the view of FIG. 2 showing a non-limiting embodiment of the invention to minimize, if not eliminate, hot spots around a communication window for passing frequencies of the electromagnetic spectrum.

With reference to FIG. 6, there is shown coating 70 applied to a glass sheet, e.g. the sheet 14 (shown in FIG. 1). The coating 70 is between the bus bars 22 and 24. Communication window 72 is provided in the coating 70 in any usual manner, e.g. using a mask during coating or a laser to delete portions of the coating. A plurality of break lines 74, i.e. deletions in the coating at least through the conductive films of the coating, are provided in the coating, e.g. by laser, around the area 72. Although not limiting to the invention, the break lines 74 are spaced from one another above and below the communication window 72 as shown in FIG. 6. As the path of the break lines 74 approach the communication window 72, the break line paths go around the communication window 72, and the spacing between adjacent break lines is different depending on the closeness of the break lines to the communication window 72. For example, the spacing between adjacent break lines near the communication window 72 is less than the spacing between adjacent break lines 74 more distant from the communication window. In this manner, as the distance from the communication window 72 increases, the break lines 74 become vertically straighter as shown in FIG. 6. Providing smaller conductive areas by using break lines reduces the hot spots around the communication window 72 because increasing the resistance of the current path, e.g. making the path narrower decreases the current flow.

Although not limiting to the invention, the break lines 74 can be provided as follows. Using a laser, a break line or deletion line extending from the top bus bar 22 to the center of the topside of the communication window 72, and from the bottom bus bar 24 to the center of the bottom or opposite side of the communication window, is made. Vertical spaced break lines are provided on each side of the center break line extending from the top bus bar toward the bottom bus bar and from the bottom bus bar toward the top bus bar for a distance equal to about the length of the communication window. Interconnecting lines are formed around the sides of the communication window interconnecting the top break line with the corresponding break bottom line. As the distance from the communication window increases the interconnecting lines become straighter. Additional vertical lines extending between the bus bars can be provided as shown in FIG. 6. As can be appreciated, any number of break lines can be used. More break lines and reduced space between the break lines reduces the hot spots and the intensity of the hot spots at the communication window.

As can be appreciated, the invention contemplates the total removal of the coating, and partial removal of the coating, in the communication window 72. The partial removal of the coating in the communication window 72 can be to provide a pattern to provide a frequency selective surface. The coating can be totally or partially removed in any usual manner, e.g. using a laser and/or a coating mask. Further, as can be appreciated, the invention is not limited to the pattern of the frequency selective surface and any of the types used in the art can be used in the practice of the invention, e.g. the slot array disclosed in the book entitled "Antennas" authored by Krause, First Edition, McGraw-Hill, 1950, page 367, and/or the patch array disclosed in U.S. Pat. No. 3,396,399 which documents are hereby incorporated by reference.

The discussion will now be directed to fabricating a windshield of the type shown in FIG. 1 having the coating segments 18. As will be appreciated, the invention is not limited thereto and a windshield having the segments 30 shown in FIG. 2, the conductive member 40 shown in FIG. 3, the coating segments 50 shown in FIG. 4 and/or the bus bars shown in FIG. 5 with or without the coating 66 shown in FIG. 5 or combinations thereof can be made in a similar manner.

As can be appreciated by those skilled in the art, the invention is not limited to the composition of the glass sheets 12 and 14, for example and not limited to the invention the glass sheets can be clear or tinted glass, for example, of the type disclosed in U.S. Pat. Nos. 5,030,592; 5,240,886, and 5,593,929 which patents are hereby incorporated by reference. The glass sheets can be annealed, tempered or heat strengthened; the glass sheets can have uniform thickness or can be wedged as viewed in cross section and/or can be soda-lime-silicate glass or borosilicate glass or any type of refractory glass.

It is the usual practice, but not limiting to the invention, when using a sputtered type coating having multiple films in a laminated assembly, e.g. a windshield, to terminate the coating short of the edges of the glass sheet on which it is applied, e.g. at least about 16 millimeters short of the edges of the sheet 14, to provide uncoated marginal edge portions or non-conductive strip 80 between the perimeter of the conductive member 16 and the peripheral edge of the sheet 14 as shown in FIG. 1. The uncoated edge portions 80 are provided to attain an acceptable edge seal during the edge sealing and laminating process. The uncoated edge portions 80 can be provided by coating the total surface of the sheet and deleting the coating e.g. as disclosed in U.S. Pat. No. 4,587,769, or using a mask during sputtering e.g. as disclosed in U.S. Pat. No. 5,492,750. The disclosures of U.S. Pat. Nos. 4,587,769 and 5,492,750 are hereby incorporated by reference.

The conductive segments 18 can be formed in any usual manner. For example, the mask used to provide the non-conductive strip 80 can have extensions to mask selected surface portions of the glass to provide the segments 18. Another technique is to remove portions of the conductive coating to provide the segments 18 during the procedure to remove the coating to provide the non-conductive strip 80. Another technique is to laser delete portions of the coating to provide the segments, e.g. provide a break in the conductive films of the coating to separate the delete portions from the bus bar and the segments. In the non-limiting embodiment of the invention discussed earlier, 130 segments 18 are provided by using a laser to form or cut deletion or break lines in the coating. The break lines can cut through all the films of the coating or can only cut through the metal films in the coating. The deletion lines can start above the bottom bus bar 24 as shown in FIG. 1 and extend toward and terminate short of the top bus bar 22 to provide segments 28 having ends 27 spaced from the top bus bar 22. Each of the segments 18 have a length of 36.5 inches (0.93 meters), a width at the top portion of 0.5 inches (1.27 cm) and a width at the bottom portion of 0.382 inch (0.97 cm). Since the process of sputtering and the sputtered coating is not limiting to the invention and are well known in the art, the sputtering process and coating will not be discussed.

The coated sheet 14 is positioned over another glass sheet 12 having a black band (not shown) of ceramic paste silk screened on the marginal edge of the sheet 12 to provide UV protection for the underlying adhesive securing the windshield in position in the automotive body. The sheet 14 having the coating segments 18 and the sheet 12 having the black band on the marginal edge are shaped and annealed. Since the process of shaping and annealing of blanks for automotive windshields is well known in the art and is not limiting to the invention, the processes will not be discussed.

The glass sheets in the following non-limiting discussion are laminated together using the interlayer composite 20 disclosed in U.S. patent application Ser. No. 10/201,863. The interlayer composite includes the top bus bar 22 and the bottom bus bar 24 secured to a plastic sheet of the type used in the art to laminated glass sheets together, e.g. a polyvinyl butyral sheet ("PVC"), polyvinyl chloride ("PVC") or polyurethane sheet. For a complete discussion of the interlayer composite 20, reference can be made to U.S. patent application Ser. No. 10/201,863. As can be appreciated, an interlayer PVB, PVC or polyurethane sheet of uniform thickness or having a wedged cross section can be used in the practice of the invention. When the interlayer without bus bars is used to laminate the glass sheets 12 and 14 together, the bus bars are applied to glass sheet in any usual manner and the conductive coating or segments are applied to the glass sheet between and in contact with the bus bars.

Figure 7:
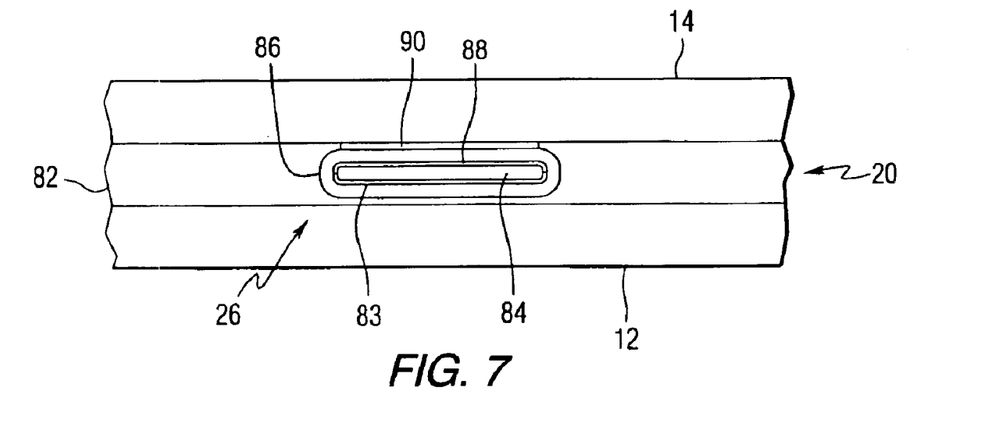
FIG. 7 is a fragmented side elevated of the windshield of FIG. 1 showing elements of the external lead.

With reference to FIGS. 1 and 7 as needed, the interlayer composite 20 includes plastic sheet 82 having a thickness of 30 mils (0.76 mm) and a surface area and configuration to overlay and cover the surface of sheets 12 and 14. The bus bars 22 and 24 are attached to the sheet by a 1 mil (0.0254 millimeter) thick layer 83 of pressure sensitive adhesive of the type sold by 3M Corporation. The bus bars have a length sufficient to extend across the conductive segments 18 with the end portions of both the top bus bar 22 and bottom bus bar 24 extending 0.25 inches (6.4 mm) beyond the edge 79 of the outermost segments 18 into the uncoated non-conductive strip 80 of the sheet 14. For a complete discussion of the bus bar arrangement extending into a non-conductive strip, reference can be made to U.S. patent application Ser. No. 10/201,864.

The top bus bar 22 and the bottom bus bar 24 are each contiguous with its respective lead 84 of its respective lead assembly 26 discussed in more detail below. The bus bars were generally parallel to one another and spaced to contact the segments 18 when the interlayer composite is positioned between the sheets. The bus bars and leads are made of copper foil having a thickness of 2.8 mils (0.07 mm). The lead of each bus bar is 0.56 inches (14 mm) wide, with the lead of the top bus bar extending from about the center portion of the top bus bar 22, and the lead of the bottom bus bar extending from the left side portion of the bottom bus bar 24, as shown in FIG. 1. Each of the leads had sufficient length to extend 1 to 1.5 inches (2.54 to 3.81 cm) from the peripheral edge of the windshield. As can be appreciated, the lead can be a filament or separate pieces of foil not contiguous with its respective bus bar.

The width of the copper foil of the bus bar 22 having the center feed is 0.28 inch (7 mm), and the width of the copper foil of the bus bar 24 having the side feed is about 0.56 inch (14 mm). A wider bus bar is preferred when using a side feed instead of a center feed to provide for an even current flow along the extended path of the bus bar. More particularly, the current moving through the right portion of the metal foil of the bus bar 24 as viewed in FIG. 1 has to travel a longer distance from the lead than current from the lead for the upper bus bar 22 must travel to a corresponding portion of bus bar 22. Therefore, the bus bar 24 should have a greater cross sectional area than the bus bar 22. Because bus bars of different thickness can cause laminating concerns, it is preferred, although not limiting to the invention, to have bus bars of uniform thickness and increase the width of the bus bar to increase its cross sectional area.

As can be appreciated, the exit location of the leads 84 from the laminate is not limiting to the invention. For example, both leads 84 can exit from the same side of the windshield as disclosed in U.S. Pat. No. 5,213,828, which disclosure is herby incorporated by reference. The leads can exit from opposite sides as shown in FIG. 1, or the leads can each exit from the same location on their respective side of the windshield, or from different locations on their respective side of the windshield as shown in FIG. 1.

With reference to FIG. 7, the discussion will now be directed to the lead assembly 26. In the practice of the invention, it is preferred to use the lead assembly disclosed in U.S. patent application Ser. No. 10/201,863; however, the invention is not limited thereto and any lead assembly can be used in the practice of the invention. The layer 83 of the pressure sensitive adhesive attaching the metal foil bus bars to the PVB sheet 82 extends along the surface portion of the lead 84 extending beyond the windshield 10.

A sleeve 86 is positioned around each of the leads 84 to electrically isolate portions of the lead and to protect the lead against mechanical damage. The sleeve is made of two pieces of a polyamide (shown as one piece in FIG. 7). Each piece has a thickness of 0.5 mils (0.127 mm), a width of 0.8 mils (20 mm) and a length of 0.8 mils (20 mm). One piece of the polyamide is placed around the bottom surface of each lead 84 and held in position by the adhesive layer 83. The other piece of the polyamide is secured on the top surface of each lead by providing a layer 88 of a pressure sensitive adhesive similar to the adhesive layer 83. The pieces of the polyamide are pressed together to flow the adhesive around the side surfaces of the lead and to adhere the polyamide pieces together to form the sleeve. A layer 90 of a thermal set adhesive is applied to the outer surface of the protective sleeve opposite to the sheet 12 as shown in FIG. 7. The thermal set adhesive has a thickness of 1 mil (0.025 mm) and a width and length sufficient to cover the portion of the sleeve between the glass sheets.

The interlayer composite 20 is positioned on the shaped sheet 14 with the bus bars in electrical contact with the segments 18. The shaped sheet 12 is placed over the composite 20. A vacuum ring of the type used in the manufacture of laminated windshields is positioned over the periphery of the assembly (the interlayer composite 20 positioned between the sheets 12 and 14 as discussed above) and vacuum of about 20–28 inches of mercury is pulled. The windshield subassembly having the vacuum applied is place in an oven set at 260° F. (126.7° C.) for 15 minutes to heat the subassembly to a temperature of 225° F. (107.2° C.). While the windshield subassembly is in the oven, the vacuum is continuously pulled through the channel to pull air from between the sheets. The heat and vacuum seal the marginal edges of the windshield subassembly. Thereafter the edged sealed windshield subassembly is placed in an air autoclave and laminated. Since the processes of edge sealing and autoclaving used in the manufacturing of laminated automotive windshields are well known in the art and are not limiting to the invention, the processes are not discussed in detail.

As can be appreciated by those skilled in the art of laminating, the edge sealing of the subassembly and laminating of the edge sealed subassembly is not limiting to the invention. For example, the subassembly can be sealed using nipper rollers or bagging the subassembly, and/or the edge sealed subassembly can be laminated by oil autoclaving.

As can be appreciated, the outer surface of the windshield can be provided with a photocatalytic coating such as the type disclosed in U.S. Pat. No. 6,027,766, or a hydrophobic coating of the type sold by PPG Industries, Inc. under the trademark AQUAPEL and disclosed in U.S. Pat. No. 5,523,162, which patents are hereby incorporated by reference.

Further, as can be appreciated, the electrically conductive members and the bus bars can be on the no. 2 (i.e. the inner major surface of the outer sheet 12) or no. 3 surface of the windshield; they can be on a surface of an interlayer sheet or the plastic sheet of the composite or in the case when two interlayer sheets are used the conductive members and bus bars can be between the two interlayer sheets.

Still further, as can be appreciated, the invention can be used to make a heating board or wall section having the invention to selective heat surfaces of the heating board or wall section As can now be appreciated, the invention is not limited to the above examples, which were present for illustration purposes only. The particular embodiments described in detail herein are illustrative only and are not limiting to the scope of the invention, which is to be given the full breadth of the appended claims and any and all equivalents thereof.

What is claimed is:

1. A heatable article comprising:
   a first continuous bus bar having a length;
   a second continuous bus bar having a length spaced from the first bus bar, wherein the second bus bar is shorter in length than the first bus bar;
   an electrically conductive member, wherein portion of the conductive member between the first and second bus bars comprises a plurality of spaced electrically conductive segments in physical and electrical contact with the first and second bus bars; an electrically conductive segment defined as an intermediate segment between adjacent segments of the plurality of conductive segments, the intermediate segment in electrical contact with one of the bus bars and electrically isolated from the other one of the bus bars to prevent current from moving from one of the bus bars through the intermediate segment to the other one of the bus bars, and at least one of the segments selected from the group of the intermediate segment, the plurality of segments and combinations thereof having varying width as the distance from the first bus bar toward the second bus bar increases, wherein length of the portion of the conductive member between the first and second bus bars and adjacent the first bus bar is greater than length of the portion of the conductive member between the first and second bus bars and adjacent the second bus bar, and the length of the portion of the conductive member between the first and second bus bars continuously decreases as the distance from the first bus bar increases, wherein the length of the conductive member is measured between ends of a bus bar.

2. The heatable article according to claim 1 wherein the segment having varying width is selected from the plurality of segments.

3. The heatable article according to claim 1 further comprising a sheet having a peripheral edge and a major surface within the peripheral edge, wherein the electrically conductive member are within and spaced from the peripheral edge of the sheet.

4. A heatable article comprising;
   a first continuous bus bar having a length;
   a second continuous bus bar having a length spaced from the first bus bar, wherein the first bus bar is longer in length than the second bus bar;
   a first plurality of discreet electrically conductive segments;
   a second plurality of discreet electrically conductive segments, the first and second plurality of conductive segments between and in electric contact with the first and second bus bars and the width of the first plurality of conductive segments continuously increases as the distance from the first bus bar increases and the width of the second plurality of conductive segments is substantially constant from the first bus bar to the second bus bar, wherein total width of the first and second plurality of conductive segments at the first bus bar is greater than the total width of the first and second plurality of conductive segments at the second bus bar, and the total width of the first and second plurality of conductive segments continuously decreases as the distance from the first bus bar increases.

5. The heatable article according to claim 4 further comprising a sheet having a peripheral edge and a major surface within the peripheral edge, wherein the first and second segments are within and spaced from the peripheral edge of the sheet.

6. A heatable article comprising:
   a pair glass sheets;
   at least one plastic sheet between the pair of glass sheets securing the glass sheets together;
   a first and a second bus bar between the glass sheets and spaced from one another, wherein the first bus bar is longer than the second bus bar;
   an electrically conductive member between the glass sheets, and between and in electric contact with the first and second bus bars; the conductive member having at least two spaced discreet segments between and in electric contact with the first and second bus bars defined as first and second segments and a third conductive segment between the first and second segments, wherein the third segment is electrically isolated from the first and second segments and in electrical contact with only the first bus bar and the watt density of the conductive member adjacent the first bus bar is at least 80% of the watt density of the conductive member adjacent the second bus bar.

7. The heatable article according to claim 6 wherein the watt density of the conductive member adjacent the first bus bar is at least 90% of the watt density of the conductive member adjacent the second bus bar.

8. The heatable article according to claim 7 wherein the watt density of the conductive member adjacent the first bus bar is at least 95% of the watt density of the conductive member adjacent the second bus bar.

9. The heatable article according to claim 6 wherein the article is an automotive transparency and the conductive member is a coating having a conductive film between a pair of dielectric films and the third segment is electrically isolated from the first and second segments by one or more deletion lines extending at least through the conductive film.

10. The automotive transparency according to claim 9 wherein end portions of the first and second bus bars are closer together than the portions of the bus bars between their end portions.

11. The automotive transparency according to claim 9 wherein the first and second segments are two segments of a plurality of electrically conductive segments, the plurality of segments between the first and second bus bars and wherein at least on one of the segments of the plurality of segments has a width greater at the first bus bar than at the second bus bar.

12. The automotive transparency according to claim 11 wherein the plurality of electrically conductive segments is a first plurality of electrically conductive segments and the third segment is one of a second plurality of electrically conductive segments with a segment of the second group of segments between adjacent segments of the first group of segments, the second group of segments between the first and second bus bars and only in electrical contact with one of the bus bars and electrically isolated from the first group of segments.

13. The automotive transparency according to claim 9 wherein the first and second segments are two segments of a plurality of electrically conductive segments, the plurality of segments between the first and second bus bars and wherein the width of at least on one of the segments of the first plurality of segments at the first and second bus bars is the same.

14. The automotive transparency according to claim 9 wherein the first and second segments are two segments of a plurality of electrically conductive segments, the plurality of segments between the first and second bus bars and wherein at least on one of the segments of the plurality of segments has a width smaller at the first bus bar than at the second bus bar.

15. The automotive transparency according to claim 9 wherein the bus bars and the coating are between a major surface of one of the glass sheets and the plastic sheet.

16. The automotive transparency according to claim 9 wherein the at least one plastic sheet is a first plastic sheet and further including a second plastic sheet with the bus bars and coating between the first and second plastic sheets.

17. The heatable article according to claim 6 wherein the first and second conductive segments is electrically isolated from the third conductive segment by one or more breaker lines.

18. The heatable article according to claim 17 wherein the first and second bus bars are continuous.

19. The heatable article according to claim 6 wherein the first and second bus bars are continuous, the conductive member is spaced from peripheral edge of the sheet and total width of the first, second and third segments at the first bus bar is greater than the total width of the first, second and third segments adjacent the second bus bar and the total width of the first, second and third segments continuously decreases as the distance from the first bus bar increases.

20. A heatable article comprising:
a first continuous bus bar having a length;
a second continous bus bar spaced from the first bus bar, the first bus bar having a length greter than the length of the second bus bar;
an electrically conductive member comprising:
a first plurality of spaced electrically conductive segments;
a second plurality of spaced electrically conductive segments, and
wherein:
a conductive segment of the second plurality of conductive segments is between adjacent ones of the first plurality of conductive segments;
the first plurality of conductive segments are in electric contact with the first and second bus bars, and the second plurality of conductive segments are in electric contact with one of the bus bars and electrically isolated from the other one of the bus bars and the conductive segment of the second plurality of conductive segments between adjacent ones of the first plurality of conductive segments is electrically isolated from adjacent segments of the first plurality of conductive segments to prevent current from moving between the first and second bus bars, and through the second plurality of conductive segments;
at least one of the segments of the first plurality of segments has varying width as the distance from the first bus bar toward the second bus bar increases, and
the total width of the first and second plurality of segments at the second bus bar is greater than the total width of the first and second plurality of segments at the second bus bar and the total width of the first and second plurality of the segments continuously decreases as the distance from the first bus bar increases.

21. The heatable article according to claim 20 wherein the electrically conductive member is continuous from the second bus bar to a position between the bus bars defined as a transition position and the first plurality of spaced electrically conductive segments extend from the transition position to the first bus bar wherein selected ones of the first plurality of spaced electrically conductive segments have decreasing width as the distance from the second bus bar toward the transition position increases.

22. The heatable article according to claim 20 wherein the first plurality of electrically conductive segments extend from the first bus bar to the second bus bar and the width of selected ones of the first plurality of conductive segments increases as the distance from the second bus bar toward the first bus bar increases.

23. The heatable article according to claim 20 wherein the first plurality of electrically conductive segments extend from the first bus bar to the second bus bar and selected ones of the first plurality of conductive segments have a decreasing width from the second bus bar to a position between the first and second bus bars defined as a transition position and an increasing width from the transition position toward the first bus bar.

24. The heatable article according to claim 23 wherein the width of the selected ones of the first plurality of conductive segments at the transition position is less than the width of the selected ones of the first plurality of conductive segments at the second bus bar.

25. The heatable article according to claim 20 wherein the first plurality of electrically conductive segments extend from the first bus bar to the second bus bar and the width of selected ones of the first plurality of conductive segments decreases as the distance from the second bus bar toward the first bus bar increases.

26. The heatable article according to claim 20 further comprising an area between the first and second bus bars defined as a communication window, wherein the resistance within the communication window is greater than the resistance outside and adjacent the communication window.

27. The heatable article according to claim 26 wherein the communication window is adjacent the first bus bar and further comprising a first plurality of spaced deletion lines in the conductive member extending from the second bus bar toward the communication window and a second plurality of deletion lines in the conductive member extending from the first bus bar toward the communication window with the first and second deletion lines extending around portions of the communication window and contacting one another to provide a plurality of electrically isolated portions of the conductive member extending from the first bus bar to the second bus bar and around the portions of the communication window.

28. The heatable article according to claim 20 further comprising a substrate having a major surface wherein the electrically conductive member is a conductive coating applied to the major surface of the substrate and the conductive segment of the second plurality of conductive segments between adjacent ones of the first plurality of conductive segments is electrically isolated from adjacent segments of the first plurality of conductive segments by one or more deletion lines.

29. The heatable article according to claim 28 wherein the conductive coating is a sputtered coating having at least one electrically conductive film between a pair of dielectric films and the deletion lines extend at least through the at least one electrically conductive film.

30. The heatable article according to claim 28 wherein the substrate is a first piece of glass and further comprising:
a second piece of glass;
a plastic sheet between the first and second pieces of glass securing the first and second pieces of glass together with the bus bars and the conductive coating between the first piece of glass and the plastic sheet.

31. The article according to claim 30 wherein the article is a transparence for use on an enclosure of the type selected from the group consisting of a residential home, a commercial building, a space vehicle, an air vehicle, a land vehicle, an over the water vehicle, an under the water vehicle, a refrigerator having a door with a viewing area and combinations thereof.

32. The article according to claim 31 wherein the article is a transparence for an automobile selected from the group consisting of a windshields, side window, back window, moon roof and combinations thereof and the conductive coating is a sputtered coating having at least one electrically conductive film between a pair of dielectric films.

33. The automotive transparency according to claim 32 wherein the automotive transparency is an automotive windshield and the first bus bar is longer than the second bus bar.

34. The automotive transparency according to claim 33 wherein the coating is continuous from the second bus bar to a position between the bus bars defined as a transition position and the first plurality of electrically conductive segments extend from the transition position to the first bus bar wherein selected ones of the first plurality of conductive segments have decreasing width as the distance from the second bus bar increases.

35. The automotive transparency according to claim 33 wherein the second plurality of electrically conductive segments extend from the first bus bar toward the transition position and the width of selected ones of the second plurality of conductive segments decreases as the distance from the first bus bar increases. distance from the first bus bar increases.

36. The automotive transparency according to claim 33 wherein the first plurality of electrically conductive segments extend from the first bus bar to the second bus bar and selected ones of the first plurality of electrically conductive segments have a decreasing width from the first bus bar to a position between the first and second bus bars defined as a transition position and an increasing width from the transition position to the second bus bar.

37. The automotive transparency according to claim 36 wherein the width of the selected ones of the first plurality of conductive segments at the transition position is less than the width of the selected ones of the conductive segments at the first bus bar.

38. The automotive transparency according to claim 33 wherein the second plurality of electrically conductive segments extend from the second bus bar to the first bus bar and the width of selected ones of the second plurality of conductive segments decreases as the distance from the first bus bar increases.

39. The automotive transparency according to claim 33 wherein the first plurality of electrically conductive segments includes a first subgroup of a plurality of electrically conductive segments and a second subgroup of a pllurality of electrically conductive segments, the conductive segments of the first and second subgroups extend from the first bus bar to the second bus bar and the width of the segments of the first subgroup decreases as the distance from the first bus bar increases and the width of the segments of the second subgroup of substantially constant from the first bus bar to the second bus bar.

40. The automotive transparency according to claim 33 further comprising an area between the first and second bus bars defined as a communication window, wherein the resistance within the communiation window is greater than the resistance outside and adjacent the communication window.

41. The automotive transparency according to claim 40 wherein the communiction window is adjacent the first bus bar and further comprising a first plurality of spaced deletion lines in the conductive member extending from the second bus bar toward the conductive member extending from the first bus bar toward the communication window with the first and second deletion lines extending around portions of the communication window and contacting one another to provide a plurality of electrically isolated portions of the conductive member extending from the first bus bar to the second bus bar and around the portions of the communication window.

42. The automotive transparency according to claim 40 further comprising:
  a first lead in electric contact with the first bus bar and extending out from between the first and second glass pieces to provide external electrical asccess to the first bus bar, and
  a secured lead in electric contact with the second bus bar and extending out from between the first and second glass pieces to provide external electrical access to the second bus bar.

43. The automotive transparency according to claim 40 wherein the conductive member is defined by a perimeter with the perimeter of the conductive member spaced from the periphery of the first glass piece and area between the perimeter of the conductive member and the periphery of the first glass sheet is defined as a non-conductive strip and each end portion of each one of the bus bars extends into the non-conductive strip.

44. The automotive transparency according to claim 40 wherein at least one of the outer major surfaces of one of the glass pieces includes a hydrophobic coating.

45. The automotive transparency according to claim 33 wherein at least one of the outer major surfaces of one of the glass piece includes a photocatalytic coating.

46. The automotive transparency according to claim 33 wherein the plastic sheet is selected from the group of polyvinyl butyral, polyvinyl chloride polyethylene and combinations thereof.

47. The automotive transparency according to claim 33 wherein at least one of the glass sheets or the plastic sheet has a portion in cross section having a wedged shape.

48. The automotive windshield according to claim 33 wherein the first and second bus bars are between the major surface of the first glass piece and the conductive member.

49. The automotive windshield according to claim 33 wherein the first and second bus bars are between the plastic sheet and the conductive member.

50. The heatable article acording to claim 28 wherein the first and second plurality of conductive segments comprise the conductive coating.

51. The heatable article according to claim 20 wherein the first plurality of electrically conductive segments includes a first subgroup of a plurality of electrically conductive segments and a second subgroup of a plurality of electrically conductive segments, the conductive segments of the first and second subgroups extend from the first bus bar to the second bus bar and the width of the segments of the first subgroup decreases as the distance from the first bus bar increases and the width of the segments of the second subgroup is substantially constant from the first bus bar to the second bus bar.

52. The heatable article according to claim 20 wherein selected segments of the first plurality of segments have an increasing width as the distance from the second bus bar increases, and selected segments of the second plurality of segments have a decreasing width as the distance from the second bus bar increases.

53. The heatable article according to claim 20 wherein the second plurality of segments is in electric contact with the second bus bar, electrically isolated from the first bus bar and the conductive segment of the second plurality of conductive segments between adjacent ones of the first plurality of conductive segments is electrically isolated from adjacent segments of the first plurality of segments.

54. The heatable article according to claim 20 wherein the conductive segment of the second plurality of conductive segments between adjacent ones of the first plurality of conductive segments is electrically isolated from adjacent segments of the first plurality of conductive segments by one or more breaker lines.

55. The heatable article according to claim 20 further comprising a sheet having a peripheral edge and a major surface within the peripheral edge, wherein the electrically conductive member is within and spaced from the peripheral edge of the sheet.

* * * * *